(12) United States Patent
Drake et al.

(10) Patent No.: US 9,598,504 B2
(45) Date of Patent: Mar. 21, 2017

(54) PROCESS FOR THE REMOVAL OF ENDOTOXINS TO PRODUCE MEDICAL QUALITY CHITOSAN AND OTHER POLYSACCHARIDES

(71) Applicants: James F. Drake, Minneapolis, MN (US); David R. Senogles, New Brighton, MN (US)

(72) Inventors: James F. Drake, Minneapolis, MN (US); David R. Senogles, New Brighton, MN (US)

(73) Assignee: CHITOGEN INC., Plymouth, MN (US)

( * ) Notice: Subject to any disclaimer, the term of this patent is extended or adjusted under 35 U.S.C. 154(b) by 126 days.

(21) Appl. No.: 14/572,749

(22) Filed: Dec. 16, 2014

(65) Prior Publication Data

US 2016/0168276 A1   Jun. 16, 2016

(51) Int. Cl.
*C08B 37/08* (2006.01)
*D01F 9/00* (2006.01)
*D06L 1/12* (2006.01)

(52) U.S. Cl.
CPC .............. *C08B 37/003* (2013.01); *D06L 1/12* (2013.01); *D01F 9/00* (2013.01)

(58) Field of Classification Search
CPC ................................ C08B 37/003; D01F 9/00
USPC .......................................................... 536/20
See application file for complete search history.

(56) References Cited

U.S. PATENT DOCUMENTS

| 4,885,168 | A | 12/1989 | Hashimoto et al. |
| 5,169,535 | A * | 12/1992 | Adachi ............... C08B 37/003 210/669 |
| 6,197,322 | B1 | 3/2001 | Dutkiewicz et al. |
| 6,310,188 | B1 | 10/2001 | Mukherjee |
| 6,699,386 | B2 | 3/2004 | Todokoro et al. |
| 6,898,809 | B2 | 5/2005 | Davis |
| 6,989,440 | B2 | 1/2006 | Sannan et al. |
| 7,125,967 | B2 * | 10/2006 | Hung ................... C08B 37/003 536/20 |
| 8,137,935 | B2 * | 3/2012 | Caroff ....................... C12P 1/04 424/234.1 |
| 8,703,176 | B2 | 4/2014 | Zhu et al. |
| 2005/0240137 | A1 | 10/2005 | Zhu et al. |
| 2008/0248508 | A1 | 10/2008 | Baker et al. |
| 2012/0021217 | A1 | 1/2012 | Hadba et al. |
| 2013/0123213 | A1 | 5/2013 | Ji et al. |

FOREIGN PATENT DOCUMENTS

| EP | 0029536 A1 * | 6/1981 | ............... C01C 1/10 |
| WO | 0180911 A1 | 11/2001 | |
| WO | WO 2008/063503 A2 * | 5/2008 | ............. C08B 37/00 |

OTHER PUBLICATIONS

Bettelheim, F.A. et al, Introduction to General & Organic Chemistry, 1998, 5th Ed., Harcourt Brace, pp. 240-241.*
International Search Report mailed Oct. 28, 2015 for PCT Application No. PCT/US2015/043510, international filing date Aug. 4, 2015, Applicant James F. Drake.

* cited by examiner

*Primary Examiner* — Ganapathy Krishnan
(74) *Attorney, Agent, or Firm* — Mark A. Litman & Associates, P.A.

(57) ABSTRACT

A process of making low-endotoxin chitosan or alkali-stable polysaccharide is performed by suspending bulk chitosan fibers or flakes or alkali-stable polysaccharide to form a reaction mixture in an aqueous solution of alcohol. Ammonia is the added to the reaction mixture to raise pH of the reaction mixture to above 9.5. The reactive mixture with a pH above 9.5 is heated at a temperature of at least 130° C. for at least 20 minutes. The heated reaction mixture is cooled to less than 60° C. and then sparged with an inert gas to remove ammonia. Separating the chitosan or alkali-stable polysaccharide from the sparged reaction mixture. The chitosan fibers or polysaccharide is rinsed with an endotoxin-free aqueous liquid to form a rinsed fiber mass. The rinsed fiber mass is further rinsed with an alcohol to remove water, and dried at a temperature below 100° C. to form the low-endotoxin chitosan or alkali-stable polysaccharide.

22 Claims, 5 Drawing Sheets

Structure of the cell envelope of a Gram-negative bacterium (e.g. *E. coli*). (PRIOR ART)

General Structure of *Salmonella* LPS.

(PRIOR ART)

Lipid A structure from E. coli.

(PRIOR ART)

Clotting cascade in Limulus Amoebocyte Lysate induced by endotoxins or beta glucans.

(PRIOR ART)

Comparison of chitosan and cellulose structures.

PROCESS FOR THE REMOVAL OF ENDOTOXINS TO PRODUCE MEDICAL QUALITY CHITOSAN AND OTHER POLYSACCHARIDES

BACKGROUND OF THE INVENTION

Field of the Invention

The present invention relates to the field of removing endotoxin from chitosan and other polysaccharides. In particular, the present technology and invention relates to the field of converting natural chitosan having undesirable levels of bacterial endotoxin (ET) to a purified and medically acceptable form enabling use of the chitosan in biotech structures and compositions. Chitosan is a positively charged polymer with a strong attraction for endotoxin and the process is particularly useful for removing these contaminating endotoxins. However, the process can also be used to remove endotoxin from other alkali-stable polysaccharides.

Background of the Art

Chitosan is typically contaminated with bacterial endotoxins (ET) at levels that are not acceptable for implantable medical devices. There is currently no economic process for producing endotoxin-free chitosan. In addition, cellulose, starch, inulin, dextran and other useful polysaccharides are often contaminated with endotoxin and can be treated by the process to remove endotoxins.

In the US, the Food and Drug Administration (FDA) requires that devices for implantation have no more than 20 International Units (IU) of endotoxin per device. Devices that contact with neurological tissues require levels below 2.5 IU per device. Medical grade chitosans have been shown to have high levels of ET and this has limited the use of chitosan in implantable devices.

Endotoxin Properties

Endotoxin is a major component of the outer surface of Gram-negative bacteria. Due to the ubiquitous presence of Gram negative bacteria in water, significant quantities of endotoxins are found in most water supplies. FIG. 1 shows the known structure of the cell envelope of a gram negative bacterium (e.g., *E. coli*) with some component parts of the envelope identified, such as the outer membrane, the periplastic space and the plasma membrane. Also shown are a Mg++ cation, porin protein, lipoprotein and other outer membrane protein. The location of peptidoglycan, phospholipids and other proteins are also shown.

The peptidoglycan sheet is actually in the periplasm, the space between the inner (plasma) and outer membranes. The inner face of the outer membrane is composed of phospholipid, the same as in the plasma membrane. The outer face of the outer membrane contains some phospholipid but primarily it is composed of lipopolysaccharide which has the amphipathic qualities of a phospholipid, Lipopolysaccharide is endotoxin. FIG. 2 shows the general structure of endotoxin from *Salmonella* species, a typical Gram negative bacteria. Imbedded in the outer membrane are various outer membrane proteins, lipoprotein and porin proteins, which sometimes play a role in virulence of a Gram-negative bacterium, but they are not considered endotoxins.

The toxic effects of endotoxin are associated with the Lipid A component. The structure of Lipid A from *Escherichia coli* is shown in FIG. 3 below. Lipid A from other Gram-negative bacteria has similar structures with modifications of the acyl chains and modification to the polysaccharide backbone.

Endotoxins are highly toxic to mammals, particularly humans. They are an exquisitely sensitive activator of immune response in cells, primarily through TLR4 (Toll-like receptor-4) stimulating a variety of cytokines involved in inflammatory and wound healing response and initiating the body's acute response to bacterial infection. Toll-like receptors are proteins found on cells of the immune system that bind to various foreign materials, such as endotoxins, and stimulate an immune response. However sustained stimulation of TLR4 by endotoxin, can produce a potentially fatal clinical condition called endotoxic shock. This endotoxemia is caused by the hyper-reaction of the innate immune system to bacterial endotoxin.

Due to the combination of hydrophilic sugars, negatively charged phosphate groups and the hydrophobic lipid additions, endotoxins are amphipathic and tend to form stable micelles in aqueous solution. Endotoxin is not appreciably inactivated by normal autoclaving (121 C for 15 to 30 minutes) and is normally removed from water by ultrafiltration or ion exchange. The toxic effects of endotoxin are associated with the lipid component (Lipid A) while the immunogenicity is associated with the polysaccharide components of the LPS. As shown in FIG. 1, the surfactant behavior of endotoxin makes the endotoxin soluble in a variety of solvents. In aqueous solutions, endotoxins form regular micelles and inverse micelles in organic solvents.

Treatments to remove or destroy pyrogens, particularly, endotoxin are referred to as methods of "depyrogenation." Oxidation with hydrogen peroxide, chemical alkylation, dry heat not less than 250 C for no less than 30 min (pharmaceutical industry standard), treatment with acid or base, ultrafiltration, application of reverse osmosis, microporous membrane filtration, absorption on sintered activated carbon or ion exchange columns have all been proposed for depyrogenation. The polycationic peptide, Polymixin B, is one of the most potent binders of endotoxin. It is used in columns to bind endotoxin and separate it from solution or to bind it and render it inactive. The surfactant behavior of endotoxin makes it attractive to hydrophobic and hydrophilic moieties as well as to positively charged species. These properties make endotoxin very difficult to remove from both polar and non-polar materials. This same surfactant behavior makes endotoxin adhere to both hydrophilic and hydrophobic surfaces. It is not particularly soluble as a single molecule as it will from regular or inverse micelles depending on its environment. At present, techniques of endotoxin removal are highly limited by these physical properties.

As discussed above, inflammatory responses are indicative of pathogenic contamination in organisms. Pyrogens are a heterogeneous group of compounds that induce immune responses that are also indicative of pathogenic contamination. In mammals, particularly humans, pyrogenic responses manifest in fever. Endotoxin is one of the most common pyrogens, and many methods of depyrogenation refer to removal of endotoxin.

Endotoxin Assay Methods

There are a number of sensitive assays for detecting endotoxin, The most common assay is the Limulus Amoebocyte Lysate (LAL) assay based on the reaction of endotoxin with lysates of hemolymph from the horseshoe crab. The assay is very sensitive and is the method recognized by most regulatory agencies as the standard for measurement of endotoxin in medical products. FIG. 4 shows the clotting cascade in Limulus Amoebocyte Lysate induced by endotoxins or beta glucans. (PRIOR ART) Factors C, B, G, proclotting enzyme, coagulogen and peptide C are supplied by the lymphocyte lysate. The presence of endotoxin catalyzes the conversion of Factor C to activated Factor C which then initiates a cascade of reactions that lead to the formation of a gel clot. Modifications of the assay produce a colored product rather than a gel clot in the final step.

Structure of Chitin and Chitosan Chitin is the primary structural material in crustacean and arthropod exoskeletons as well as a constituent of fungal cell walls. Chitin is an analog of cellulose which is the primary structural element of woody plants. Chitin is similar in structure to cellulose, the primary structural reinforcement of woody plants. Both materials are highly crystalline, insoluble polysaccharide polymers based on the beta D-glucose structure. In chitin, the N-acetyl group replaces the hydroxyl group at the 2 position found in cellulose, Chitin is insoluble in most solvents and must be converted to chitosan to be useful. A comparison of the chemical structures of chitin and cellulose is shown in FIG. 5.

The structure of chitin is a linear polymer of beta (1-4) D-N-acetylglucosamine. Chitosan, derived from chitin, is a linear polysaccharide composed of randomly distributed β-(1-4)-linked D-glucosamine (deacetylated unit) and N-acetyl-D-glucosamine (acetylated unit). Chitosan is obtained by treating purified chitin from shrimp and other crustacean shells with concentrated alkali sodium hydroxide. This treatment removes acetyl groups and creates free glucosamine residues in the polymer chain. The extent of removal of acetyl groups (Degree of Deacetylation, DDA) and the molecular weight determines the properties of chitosan. The degree of deacetylation (% DDA) can be determined by NMR spectroscopy or titration. The % DDA in commercial chitosans ranges from 60 to 100% and the molecular weight is between 3800 and 2,000,000 Daltons. These chitosans are soluble in aqueous solutions at pH values less than 7.5 to 8.0. The solubility depends upon the degree of deacetylation, the molecular weight and the temperature Addition of co-solvents such as ethanol or acetone will reduce the solubility.

Other useful materials from which endotoxins may be removed generally include alkaline-stable polysaccharides, materials well known in the art. The use of enzymes in detergents is well known. Generally, enzymes used for detergent purposes have primarily been the alkaline stable proteases, lipases and alpha-amylases, Of the alkaline proteases, serine proteases derived from *Bacillus* species, namely *Bacillus subtilis, Bacillus licheniformis,* and alkalophilic *Bacillus* bacteria have been widely used in detergent formulations, (Starace C. and Barford, H. C., Encyclopedia Chem. Technol, 9, pp. 138-148 (1980); Koki Horikoshi and Terahiko Akika, A New Microbial World, Springer-Verlag, N.Y., p. 93 (1982)). See also U.S. Pat. No. 5,256,557 (Shetty), Published U.S. Patent Application Document No. 20130165539 (Carbonell).

The amino group in chitosan has a pKa value of ~6.5, which leads to a protonation in acidic to neutral solution with a charge density dependent on pH and the % DA-value. This makes chitosan water soluble and a bioadhesive which readily binds to negatively charged surfaces such as mucosal membranes. Chitosan enhances the transport of polar drugs across epithelial surfaces, and is biocompatible and biodegradable. It is not approved by FDA for drug delivery though. Purified quantities of chitosans are available for biomedical applications.

Chitosan has a number of commercial and biomedical uses. It can be used in agriculture as a seed treatment and biopesticide, helping plants to fight off fungal infections. In winemaking it can be used as a fining agent, also helping to prevent spoilage. In industry, it can be used in a self-healing polyurethane paint coating. In water treatment, it is used as a flocculent to precipitate suspended material. The usefulness of chitosan as a hemostatic agent has been known since Malette (U.S. Pat. No. 4,394,373) first described the interaction of chitosan solutions with red blood cells. A number of commercial products use chitosan as a hemostatic agent. The interaction of the positively charged polymer chains with negatively charged tissue surfaces creates strong adhesive forces that result in hemostatic and wound healing effects. Also, the strength and tissue compatibility of chitosan has proven useful in various tissue scaffolding and organ regeneration applications.

Production of Chitosan Fibers

The production of chitosan fibers consists of two separate steps. First, raw chitosan is produced from the chitin in crustacean shells by standard processes, and second, the raw chitosan is dissolved in an acid solution and spun into fibers. The fiber bundles are then chopped into short lengths. Chitosan productin begins with shrimp, lobster or crab shells containing chitin which are washed with hot water. To remove extraneous protein, the washed chitin is treated with ~4% sodium hydroxide, 40° C., for 12 hours. Calcium carbonate and other materials are removed by treatment with a solution of ~4% hydrochloric acid, 40° C., for 12 hours. The dried material is then deacetylated in a solution of ~40% sodium hydroxide, 40-100 C, for 12 to 24 hours. The chitosan product is then washed with water and dried. The dried chitosan is then sent to the extruder where it is dissolved in acid and spun into fibers. Typical chitosan bulk raw fiber as received from the extruder consists of fibers 2 to 3 cm long collected into loose bundles. The chitosan has a molecular mass of greater than 500,000 Daltons and a degree of deacetylation of greater than 80%. The bioburden and endotoxin levels vary and need to be controlled In the final stages of chitosan production, the extreme conditions (40% NaOH, 100° C.) required for hydrolysis of the acetyl groups to generate chitosan from chitin would destroy any endotoxins present in the starting material. However, subsequent washing of the final product and spinning into fibers will introduce endotoxin unless the entire process uses endotoxin-free water. This is not feasible in the normal industrial scale process used for chitosan fiber production; thus an economic method for removal of endotoxin from the final medical-grade chitosan fibers is desirable.

Published US Patent Application Document No 20080248508 (Baker) discloses a rigid and extensive chemical treatment to try to produce ultrapure, low-endotoxin chitosan by: (a) utilizing sterile, pyrogen-free lab ware, reagents and materials in strict endotoxin-free, sterile environment; (b) swelling chitosan having endotoxins, for up to 24 hours; (c) dissolving ratios equivalent to 1 kg/25 L to 1.5 kg/25 L of said chitosan in 0.01M to 4.0 M of a hydroxide base, forming a chitosan base solution and continuously stirring said chitosan base solution; (d) heating said base solution between 60° C. and 100° C. for 45 minutes to 4 hours and continuously stirring said heated base solution; (e) rinsing said chitosan solution with up to 10× volume of ultra-pure pyrogen-free water and removing endotoxin fragments and residual endotoxin; (f) neutralizing said solution to a pH between 6.8 and 7.5; (g) forming a ultra-pure low endotoxin chitosan slurry; (h) transferring said slurry to a endotoxin-free closed system; (i) removing excess water from said slurry and forming said ultra-pure, low-endotoxin chitosan having an endotoxin concentration between 100 EU/g and 20 EU/g; (j) retaining molecular weight integrity of said chitosan at 30,000 Daltons or greater and between 75% and 90% of said chitosan having endotoxins; and (k) storing said chitosan in endotoxin-free storage containers in an endotoxin-free environment with sterile, endotoxin-free connects.

As taught U.S. Pat. No. 6,699,386 to Todokoro et al, chitosan has been used as an endotoxin adsorbent and as a material for removing endotoxin from liquids and solutions as taught in U.S. Pat. No. 5,169,535 to Adachi et al., and U.S. Pat. No. 4,885,168 to Hashimoto et al. Hypotheses suggest that the hydrophobic lipid of the endotoxin associates non covalently with the chitosan backbone.

Furthermore, under non-endotoxin-free conditions, chitosan continually absorbs endotoxin from the environment. U.S. Pat. No. 7,125,967 to Hung et al. teach the removal of endotoxin from chitosan to form a water-soluble chitosan by re-acetylating soluble chitosan in a slightly basic solution that contains a phase transfer agent including quaternary ammonium salts, crown ethers and/or pyridinium salts and transferred in a variety of organic solvents. Molecular weight (MW) is degraded in the process. However, this method is dependent on organic solvent extraction which is cost prohibitive in large scale production of biomaterials. The utilization of solvents are prone to organic residues which are highly toxic for food or biomedical applications. Hung et al also fails to teach how to prevent contamination of the clean chitosan product. Additionally, the process presupposes a soluble chitosan; thus a low-molecular weight solvent soluble chitosan is required.

Few sources report methods for purifying chitosan once it is prepared. U.S. Pat. No. 6,898,809 to Qian et al. utilize metal and protein complexing agents to remove unwanted metal and protein contaminants from insoluble chitosan. Qian et al. disclose removal of toxins through a variety of pH changes, but fail to disclose techniques for removing endotoxins. U.S. Pat. No. 6,989,440 to Sannan et al. disclose a method of purifying chitin utilizing organic and organic acid solvents to remove fatty acids and salts including calcium. Takanori et al fail to disclose the removal of exogenous or endogenous endotoxins.

Removal of proteins, calcium carbonate and other major shell component contaminants are disclosed in processes for producing a clean chitosan from shells. Additionally, methods involving quenching in liquid nitrogen have been disclosed to minimize chemicals, with the addition of a dialysis step to produce "biocompatible" chitosan, such as in U.S. Pat. No. 6,310,188 to Mukherjee. However, none of these processes teach the significance of endotoxin levels or the relevant role of exogenous endotoxin in the final processes of chitosan drying or preparation.

Other Polysaccharides

The glycosidic bond used to construct the backbone of many polysaccharides is generally resistant to alkaline hydrolysis. Cellulose and starch for example are swollen, but not degraded by several hours of treatment at 100 C in alkali at pH 12 to 14. Endotoxin, however, contains phosphodiester and ester bonds that are that are relatively more labile to alkaline hydrolysis than the glycosidic linkages in a polysaccharide. If the polysaccharide contains alkali-labile entities such as ester, halogen, or similar groups subject to nucleophilic attack, the process describe here may not be useful. The suitability of the process for a particular polysaccharide can be determined from a knowledge of the polysaccharide's structure or determined empirically by treating a small sample under the process conditions described herein. Treatment of aqueous solutions or suspensions of polysaccharides under the conditions described herein will inactivated large amounts of endotoxin. Following treatment of a particular polysaccharide according to the art disclosed herein, measurements of its properties, such as molecular weight or biological activity, can be used to determine the suitability of the process for removing endotoxin from said material.

SUMMARY OF THE INVENTION

A process of making low-endotoxin chitosan or alkali-stable polysaccharide) The process may be generally performed by:
  suspending bulk chitosan fibers (or other suitable polysaccharide) having endotoxins therein to form a reaction mixture comprising an aqueous solution of alcohol;
  adding ammonia to the reaction mixture to raise pH of the reaction mixture to above 9.5;
  heating the reactive mixture with a pH above 9.5 at temperatures of at least 130 C for at least 20 minutes;
  cooling the reaction mixture to less than 60 C;
  sparging the cooled reaction mixture with an inert gas to remove ammonia;
  at least partially separating the chitosan fibers (or other suitable polysaccharide) from liquid carrier;
  rinsing the chitosan fibers (or other polysaccharide) with an endotoxin-free aqueous liquid to form a rinsed fiber mass;
  rinsing the rinsed fiber mass with an alcoholic liquid to remove water; and
  drying the fiber mass at a temperature below 100° C.

Lipid A from other Gram-negative bacteria is shown to have similar structures with modifications of the acyl chains and modification to the polysaccharide backbone. (PRIOR ART)

Figure 1:
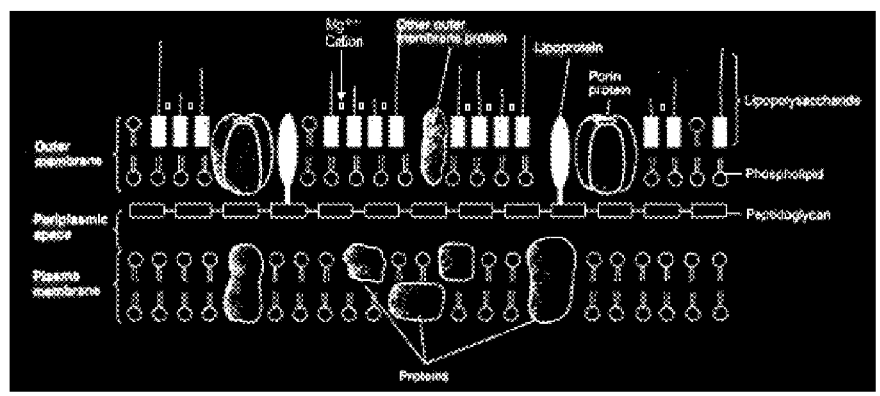
FIG. 1. Structure of the cell envelope of a Gram-negative bacterium (e.g. *E. coli*). (PRIOR ART)
Figure 2:
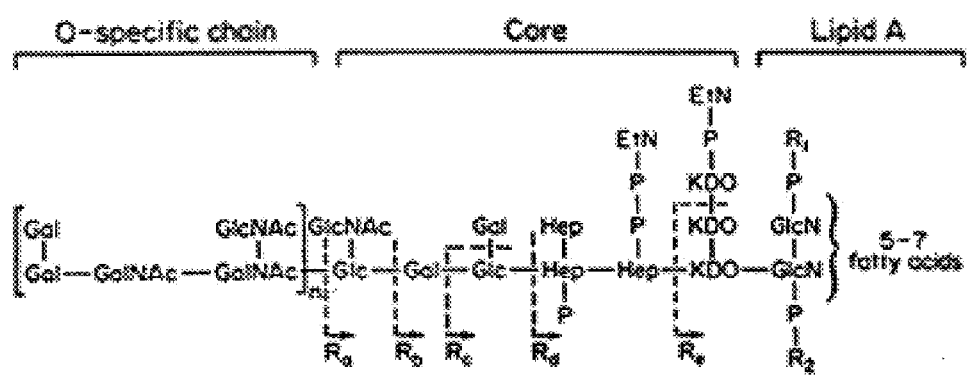
FIG. 2. General Structure of *Salmonella* LPS. Glc=glucose; GlcNac=N-acetyl-glucosamine; Gal=galactose; Hep=heptose; P=phosphate; Etn=ethanolamine; R1 and R2=phoshoethanolamine or aminoarabinose. Ra to Re indicate incomplete forms of LPS. (PRIOR ART)
Figure 3:
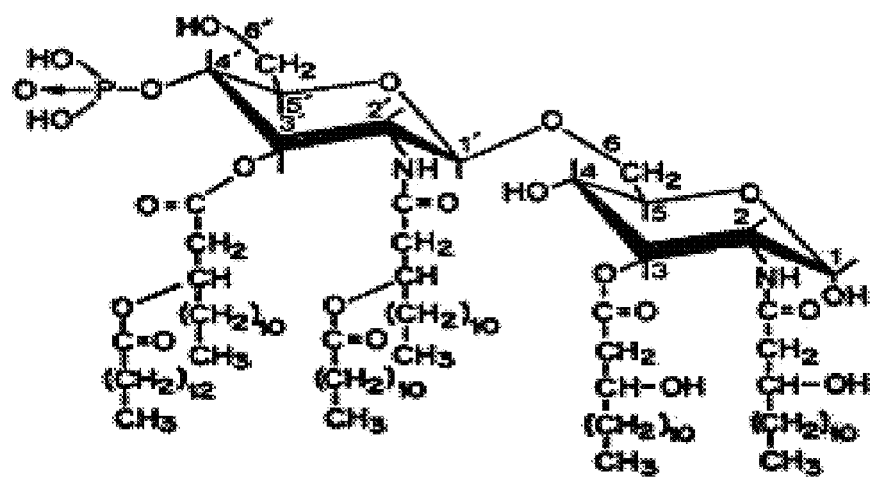
FIG. 3. Lipid A structure from *E. coli*.
Figure 4:
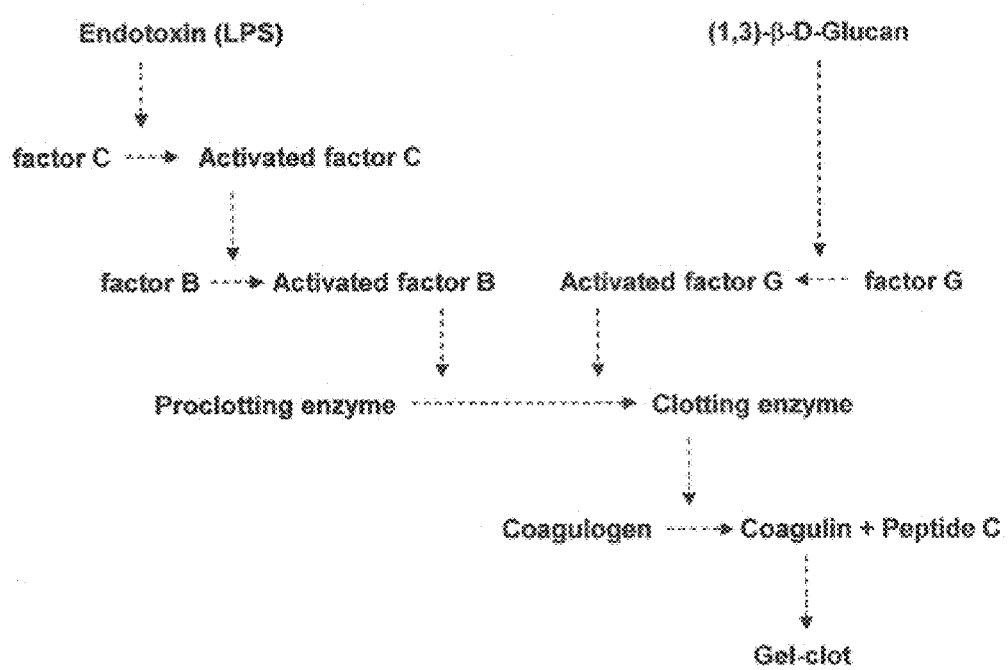

FIG. 4. Clotting cascade in Limulus Amoebocyte Lysate induced by endotoxins or beta glucans. (PRIOR ART)

Figure 5:
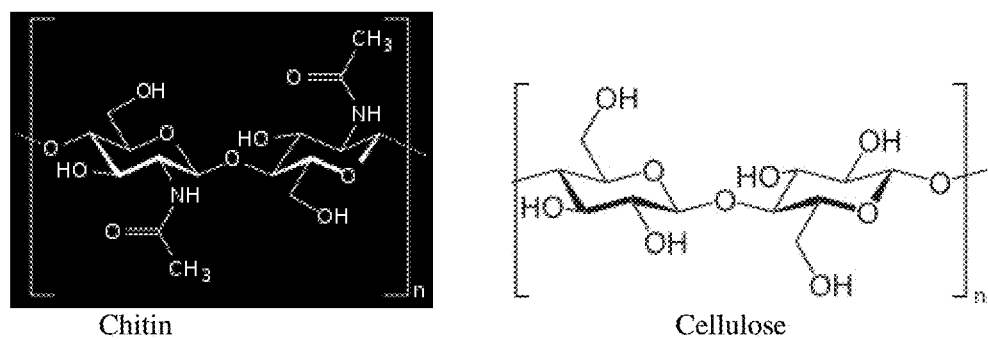

FIG. 5. Comparison of chitosan and cellulose structures.

DETAILED DESCRIPTION OF THE INVENTION

A process to make low-endotoxin chitosan (or other suitable polysaccharide). The process may be generally performed by:
  suspending bulk chitosan fibers (or other suitable, e.g., alkali-stable polysaccharide) having endotoxins therein in a solution of alcohol and water to form a reaction mixture.
  adding ammonia to the reaction mixture to raise pH of the reaction mixture to above 9.5;
  heating the reactive mixture with a pH above 9.5 at temperatures of at least 130 C for at least 20 minutes;
  cooling the reaction mixture to less than 60 C;
  sparging the cooled reaction mixture with an inert gas to remove ammonia;

at least partially separating the chitosan fibers from liquid carrier;

rinsing the at least partially separated chitosan fibers with an endotoxin-free aqueous liquid to form a rinsed fiber mass;

rinsing the rinsed fiber mass with an alcoholic liquid to remove water; and drying the fiber mass at a temperature below 100° C.

The process may use an aqueous solution of alcohol comprising between 50-95% water and 50-5% alcohol, preferably between 70-90% water, and most preferably between 80-90% water (e.g., 85% water, 15% alcohol). The alcohol preferably is a C1-C4 alcohol and most preferably isopropyl alcohol, and the aqueous solution of alcohol comprises 70-92% water and 30-8% isopropyl alcohol.

The process may have the ammonia added to provide a pH of between 10.0 and 13, and preferably between 10.0 and 12.0. The heating of the reaction mixture is preferably done at a temperature of 120-150° C. for 20-45 minutes. The sparging may be done with a fluid composition comprising an inert gas (e.g., nitrogen, noble gases, $CO_2$, etc), especially $N_2$. The fluid composition will preferably be gaseous $N_2$. The endotoxin-free aqueous liquid may be an alcohol and water solution, for example a C1-C4 alcohol and water solution, and preferably the alcohol is isopropyl alcohol. The endotoxin-free wash solution may be prepared by heating said solution at 140 C for 40 to 60 minutes prior to use. The rinsing of the rinsed fiber mass with an alcoholic liquid to remove water may include rinsing with a 95%-100% alcohol-based, water-free liquid, preferably with a 100% alcohol liquid, a 100% C1-C4 alcohol liquid and preferably 100% isopropyl alcohol. The final drying may be done by air drying, conveyor air drying, oven drying, infrared assisted drying and the like, with the air temperature preferably within a range of 55-75° C. or 60° C.

After the manufacture of the medical grade chitosan, the collected product should be stored as chitosan in an endotoxin-free storage containers in an endotoxin-free environment with sterile, endotoxin free connects.

Given its natural predilection towards minimal toxicity and biological inertness, chitosan can be a very important component of medical and biological technologies. Although commodity grade chitosan is inexpensive and abundant, it has remained unsuitable for non-food applications in humans and animals due to residual natural contaminants, primarily protein and endotoxins. In food applications, these residual natural contaminants are easily passed through the digestive tract without harboring ill effects. In medical and biological applications involving open wounds, blood and organs, the available endotoxins in non-medical grade chitosan initiate innate an adaptive immune responses that render chitosan unsuitable for medical use. In recognition, the United States Food and Drug Administration has imposed strict guidelines on the allowable levels of endotoxin in pharmaceuticals, medical devices and products that contact human tissue, blood, bone or that can be absorbed by the body or implanted within the body.

Current methods of producing medical grade ("ultrapure") chitosan are limited to low molecular weight chitosan and/or are cost prohibitive. Furthermore, these known methods fail to provide means for retaining purity throughout processing and upon storage. Purity retention and molecular weight retention, particularly for high molecular weight chitosan, is a challenge, because of chitosan's ability to absorb and bind exogenous chitosan from the environment, both during processing and storage. There is a clear need for inexpensive methods to produce and maintain high molecular weight, ultra-pure chitosan. It is important to note that the preservation and control of molecular weight (MW) is relatively important. In order to extrude strong fibers, high molecular weight chitosan is required. Tissue scaffolding and cell support require chitosan of a substantial MW, greater than 30 kDa, as do wound dressings and drug delivery systems. While other processes do not require chitosan of specific MWs or require low MW chitosan for solubility during the cleaning and processing stage, the present invention may maintain the molecular weight of the chitosan above 70% of the original value. Medical Grade Chitosan from Commodity or Food Grade Chitosan.

The present technology is directed to the control of costs in the production of high quality, medical grade chitosan having ultra-low endotoxin levels and the chitosan produced therefrom. Endotoxin levels in the chitosan may be in the range of 20 EU/gm or even near 0 EU/gm. The lower limits are difficult to quantify by existing methods.

In accordance with the present invention, commodity or food-grade chitosan is contacted with controlled elevated pH solutions at relatively moderate temperatures (e.g., the major steps of the process occurring between 40-170° C.). These steps destroy significant fractions of the endotoxin present in the material, regardless of the source, which can then be rinsed away in final steps.

In accordance with the present invention, it is desirable to control several variables within the process of endotoxin removal from commodity or food grade chitosan or other alkali-stable polysaccharide.

The alkaline environment breaks phosphodiester and ester bonds between the lipid and polysaccharide part of the LPS. However its action must be controlled to prevent the systematic break down of the glycosidic link between the glucosamine rings in the chitosan backbone. Controlling concentrations of the starting material may also be of importance, but can be overcome by utilizing significantly longer reaction times and higher temperatures. The correlation of temperature (exponentially dependent) and concentration (linearly dependent) to the optimal purity is well understood to one of ordinary skill Stirring is also required to keep the chitosan particles from settling and providing full surface area contact with the solution. Smaller particle sizes of chitosan are more optimally cleaned. Because chitosan is insoluble in base, it remains in a particulate form. Hence, the initial step of pre-swelling in water or methanol helps to solvate the chitosan and provide a larger surface area for exchange of solution and endotoxin.

In the above-cited Published US Patent Application Document No. 20080248508, the required process step (a) requires special treatment of equipment and elaborate procedures to avoid re-contaminating the product. The reference is somewhat compulsive about handling the product in clean rooms. This is not totally necessary since most endotoxin contamination is the result of water contact during processing. Air-borne endotoxin is usually minimal in normal good manufacturing procedures.

Step (b) is superfluous and optional the present technology. Step (c) requires liquid to chitosan ratios of 25:1 to 17:1 whereas our application allows operation with liquid to chitosan volume ratios of 5:1 to 10:1.

Step (d) of 20080248508 has a heating time of 45 minutes to 4 hours to achieve endotoxin levels of 20 to 200 EU/gm. The presently enabled process allows 45 minutes to one hour and achieves endotoxin levels of 20 to 0.2 EU/gm, and the range of 10 to 0.2 or less EU/gm is itself a significant achievement without significantly adversely reducing the molecular weight of the chitosan during processing. The present process also has achieved low endotoxin levels without extensive rinsing. The use of high concentrations of NaOH in 20080248508 (up to 4 M/L or 160 grams/L) requires lots of rinsing.

Step (f) of 20080248508 again using the strong base, NaOH, requires acid for neutralization. The present technology uses ammonia to raise the pH. The ammonia can be removed by sparging the solution with nitrogen or air.

As noted herein, one skilled in the art can modify, adjust, vary and extrapolate materials and conditions and remain within the scope of the generic process enabled herein.

What is claimed:

1. A process for making a) low-endotoxin chitosan or b) low-endotoxin alkali-stable polysaccharides comprising:
    suspending c) bulk chitosan fibers or chitosan flakes or d) alkali-stable polysaccharides, respectively, having endotoxins therein in a solution of alcohol and water to form a reaction mixture;
    adding ammonia to the reaction mixture to raise pH of the reaction mixture to above 9.5;
    heating the reaction mixture with the pH above 9.5 at a temperature of at least 130° C. for at least 20 minutes;
    then cooling the reaction mixture to less than 60° C.;
    sparging the cooled reaction mixture with an inert gas to remove ammonia from the cooled reaction mixture containing the a) chitosan fibers or flakes or b) alkali-stable polysaccharide;
    at least partially separating the a) chitosan fibers or flakes or b) alkali-stable polysaccharide from the sparged reaction mixture;
    rinsing the separated a) chitosan fibers or flakes or alkali-stable polysaccharide with an endotoxin-free aqueous liquid to form a rinsed mass;
    further rinsing the rinsed mass with liquid comprising a water-free alcohol to remove water; and
    drying the rinsed mass with water removed at a temperature below 100° C.

2. The process of claim 1 wherein the aqueous solution of alcohol comprises between 50-95% water and 50-5% alcohol.

3. The process of claim 2 wherein the alcohol in the solution of alcohol and water comprises a C1-C4 alcohol.

4. The process of claim 3 wherein the alcohol in the solution of alcohol and water is isopropyl alcohol.

5. The process of claim 4 wherein the solution of alcohol and water consists essentially of 70-92% water and 30-8% isopropyl alcohol.

6. The process of claim 1 wherein the ammonia is added to provide a pH of between 10.0 and 13.

7. The process of claim 5 wherein the ammonia is added to provide a pH of between 10.0 and 12.0.

8. A process for making a) low-endotoxin chitosan or b) low-endotoxin alkali-stable polysaccharides comprising:
    suspending c) bulk chitosan fibers or flakes or d) alkali-stable polysaccharides, respectively, having endotoxins therein in a solution of alcohol and water to form a reaction mixture;
    adding ammonia to the reaction mixture to raise pH of the reaction mixture to above 9.5;
    heating the reaction mixture with the pH above 9.5 at a temperature of 120-150° C. for 20-45 minutes;
    cooling the reaction mixture to less than 60° C.;
    sparging the cooled reaction mixture with an inert gas to remove ammonia from the cooled reaction mixture;
    at least partially separating the a) chitosan fibers or flakes or b) alkali-stable polysaccharide from the sparged reaction mixture;
    rinsing the at least partially separated a) chitosan fibers or flakes or b) alkali-stable polysaccharide with an endotoxin-free aqueous liquid to form a rinsed mass;
    rinsing the rinsed mass with a liquid comprising a water-free alcohol to remove water; and
    drying the rinsed mass with water removed.

9. The process of claim 8 wherein the solution of alcohol and water consists essentially of 70-92% water and 30-8% isopropyl alcohol.

10. The process of claim 9 wherein heating the reaction mixture also stabilizes the c) bulk chitosan fibers or flakes or d) alkali-stable polysaccharides.

11. The process of claim 8 wherein sparging is done with a fluid composition comprising $N_2$.

12. The process of claim 9 wherein sparging is done with a fluid composition comprising $N_2$.

13. The process of claim 10 wherein sparging is done with a fluid composition comprising $N_2$.

14. The process of claim 8 wherein the endotoxin-free aqueous liquid comprises an alcohol and water solution.

15. The process of claim 14 wherein the endotoxin-free aqueous liquid consists essentially of an isopropyl alcohol and water solution.

16. The process of claim 12 wherein the endotoxin-free aqueous liquid comprises an isopropyl alcohol and water solution and further comprising a chelating agent.

17. The process of claim 11 wherein the endotoxin-free aqueous liquid comprises an isopropyl alcohol and water solution.

18. The process of claim 1 wherein rinsing the rinsed mass is performed with a water-free liquid to remove water, the water-free liquid rinsing performed with a 100% alcohol.

19. The process of claim 5 wherein rinsing the rinsed mass is performed with a 100% alcohol to remove water.

20. The process of claim 8 wherein rinsing the rinsed mass is performed with a 100% alcohol to remove water.

21. The process of claim 11 wherein rinsing the rinsed mass is performed with a 100% alcohol to remove water.

22. The process of claim 21 wherein the fibers are dried at 55-75° C.

* * * * *